(12) United States Patent
Koral et al.

(10) Patent No.: US 11,522,879 B2
(45) Date of Patent: Dec. 6, 2022

(54) SCRUBBER FOR DISTRIBUTED DENIAL OF SERVICE ATTACKS TARGETTING MOBILE NETWORKS

(71) Applicant: AT&T Intellectual Property I, L.P., Atlanta, GA (US)

(72) Inventors: Yaron Koral, Cherry Hill, NJ (US); Tzvi Chumash, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 289 days.

(21) Appl. No.: 16/879,222

(22) Filed: May 20, 2020

(65) Prior Publication Data

US 2021/0367955 A1    Nov. 25, 2021

(51) Int. Cl.
*H04L 9/40* (2022.01)
*H04W 12/122* (2021.01)

(52) U.S. Cl.
CPC ...... *H04L 63/1416* (2013.01); *H04L 63/1458* (2013.01); *H04W 12/122* (2021.01); *H04L 2463/142* (2013.01)

(58) Field of Classification Search
None
See application file for complete search history.

(56) References Cited

U.S. PATENT DOCUMENTS

| | | | |
|---|---|---|---|
| 2006/0236402 A1* | 10/2006 | Russell | H04L 63/1458 726/25 |
| 2016/0029246 A1* | 1/2016 | Mishra | H04L 47/32 370/235 |
| 2019/0253388 A1* | 8/2019 | Verma | H04W 12/088 |
| 2019/0349753 A1* | 11/2019 | Chen | H04W 12/0471 |
| 2020/0314140 A1* | 10/2020 | Wang | H04W 60/06 |
| 2021/0051164 A1* | 2/2021 | Rasovic | H04L 63/0236 |
| 2021/0112079 A1* | 4/2021 | Campo Trapero | H04L 63/1441 |
| 2021/0185538 A1* | 6/2021 | Zhang | H04L 63/105 |
| 2021/0250762 A1* | 8/2021 | Lei | H04W 12/041 |
| 2021/0250811 A1* | 8/2021 | Guo | H04L 47/32 |

* cited by examiner

*Primary Examiner* — Michael Pyzocha
(74) *Attorney, Agent, or Firm* — Guntin & Gust, PLC; Kenneth Kwan

(57) ABSTRACT

A device includes a processor and a memory. The processor effectuates operations including receiving signaling messages traversing a first interface or a second interface from the network traffic, translating the signaling messages into one or more events, detecting one or more anomalies by analyzing the one or more events, determining whether the one or more anomalies is indicative of an attack on a telecommunications network and performing a remediation action to the signaling messages resolving the attack when the one or more anomalies is indicative of an attack on the telecommunications network.

20 Claims, 8 Drawing Sheets

SCRUBBER FOR DISTRIBUTED DENIAL OF SERVICE ATTACKS TARGETTING MOBILE NETWORKS

TECHNICAL FIELD

This disclosure is directed to a system and method for managing software-defined networks, and, more specifically, to detecting and mitigating attacks on a telecommunications network via connected devices.

BACKGROUND

Communication networks have migrated from using specialized networking equipment executing on dedicated hardware, like routers, firewalls, and gateways, to software defined networks (SDNs) executing as virtualized network functions (VNF) in a cloud infrastructure. To provide a service, a set of VNFs may be instantiated on general-purpose hardware. Each VNF may require one or more virtual machines (VMs) to be instantiated. In turn, VMs may require various resources, such as memory, virtual central processing units (vCPUs), and network interfaces or network interface cards (NICs).

When communications network implements fifth generation cellular network technology (5G), it is possible to allow operators to separate an evolved packet core (EPC) into a control plane that can reside in a centralized location, for example the middle of the country, and for the user plane to be placed closer to the application it is supporting. This type of separation may be helpful for applications such as, the connected car. In that scenario, a network operator can place the EPC user plane in a data center in a city so that it is closer to the application and therefore reduces the latency. This scenario also works well for high-bandwidth applications like video. Because the core user plane is located closer to the end user the operator does not have to backhaul traffic to the way to central hub and may provide for efficient processing.

This background information is provided to reveal information believed by the applicant to be of possible relevance. No admission is necessarily intended, nor should be construed, that any of the preceding information constitutes prior art.

SUMMARY

Disclosed herein is a device having a processor and a memory coupled with the processor. The processor effectuates operations including receiving signaling messages traversing a first interface or a second interface from the network traffic. The processor further effectuates operations including translating the signaling messages into one or more events. The processor further effectuates operations including detecting one or more anomalies by analyzing the one or more events. The processor further effectuates operations including determining whether the one or more anomalies is indicative of an attack on a telecommunications network. The processor further effectuates operations including performing a remediation action to the signaling messages resolving the attack when the one or more anomalies is indicative of an attack on the telecommunications network.

Disclosed herein is a computer-implemented method. The computer-implemented method includes receiving, by a processor, signaling messages traversing a first interface or a second interface from the network traffic. The computer-implemented method further includes translating, by the processor, the signaling messages into one or more events. The computer-implemented method further includes detecting, by the processor, one or more anomalies by analyzing the one or more events. The computer-implemented method further includes determining, by the processor, whether the one or more anomalies is indicative of an attack on a telecommunications network. The computer-implemented method further includes performing, by the processor, a remediation action to the signaling messages resolving the attack when the one or more anomalies is indicative of an attack on the telecommunications network.

Disclosed herein is a computer-readable storage medium storing executable instructions that when executed by a computing device cause said computing device to effectuate operations including receiving signaling messages traversing a first interface or a second interface from the network traffic. Operations further include translating the signaling messages into one or more events. Operations further include detecting one or more anomalies by analyzing the one or more events. Operations further include determining whether the one or more anomalies is indicative of an attack on a telecommunications network. Operations further include performing a remediation action to the signaling messages resolving the attack when the one or more anomalies is indicative of an attack on the telecommunications network.

BRIEF DESCRIPTION OF THE DRAWINGS

Aspects of the herein described telecommunications network and systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
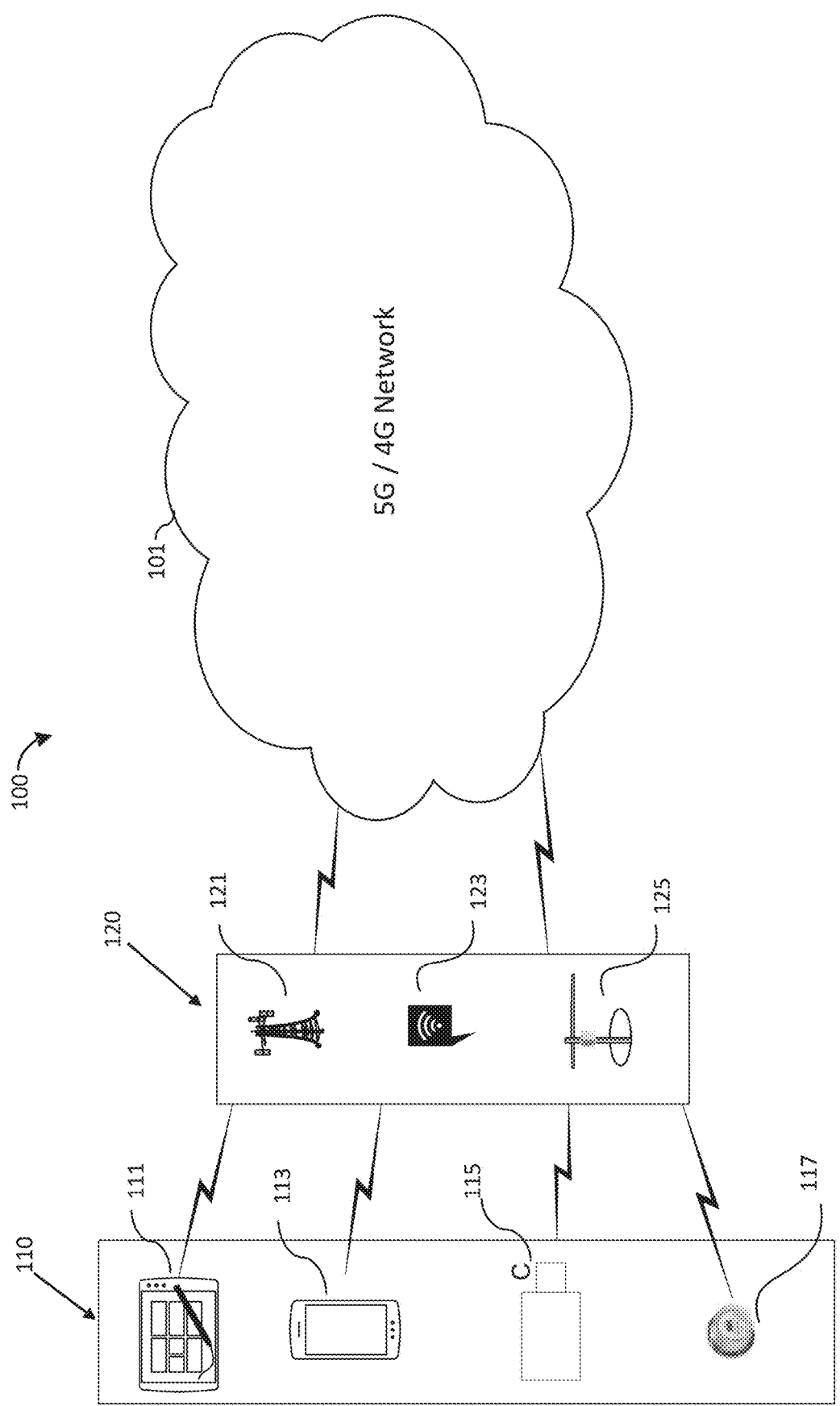
FIG. 1 is a block diagram of an exemplary operating environment in accordance with the present disclosure.

The Internet of Things (IoT) may be described as a computing concept describing an idea of physical devices (computing devices, sensors, mechanical and digital machines, etc.) being connected to the Internet and being able to identify themselves to other devices using unique identifiers (UIDs). The physical devices can use their UID and connection to the Internet to transfer data (IoT data) without requiring human-to-human or human-to-computer interaction.

Conventionally, IoT data is extracted from various IoT devices (e.g., smart meters, commercial security systems, traffic monitoring systems, weather monitoring systems, vehicles, smart home devices and sensors), which may utilize different protocols. The extracted IoT data can be sent from an associated IoT device or accessed via the IoT device using a wired or wireless communication network.

Because the IoT devices are connected to the communication network and are often commodity devices which are often mass produced cheaply and utilize low energy technologies to reduce power consumption, security for the IoT device is not a primary concern. Accordingly, IoT devices are increasingly susceptible to hackers, which may not only intercept data sent by the IoT device but may also send commands to the IoT device to control the IoT device.

Moreover, attacks on IoT devices tend to be on an Internet network or a peer mobile networks, which attempts to take advantage of vulnerabilities in the connection of the IoT devices to the Internet or mobile network once these IoT devices are already connected to the communication network. For example, IoT device firmware is a commonly unprotected attack surface that hackers use to get a foothold in a network.

While the hacking of a single IoT device may be problematic, issues may be compounded when many (tens, hundreds, thousands, etc.) IoT devices are hacked. A hacker that compromises a set of IoT devices can use the compromised IoT devices to, for example, attack a local cloud compute environment, attack a wireless network using signaling storms, attack a wireless network using relay data, or unnecessarily consuming RAN bandwidth. Additionally, hackers may send commands to the compromised IoT devices of a target (e.g. company, hospital, factory, government, university, etc.) in order to conduct a denial-of-service attack (DoS attack) or a distributed denial-of-service (DDoS) attack on the target.

Accordingly, providing a signaling scrubber, at or near an entry point to a telecommunications network, having one or more elements that monitors and processes network traffic (e.g., signaling and control data) in order to detect and mitigate network attacks may be beneficial. By detecting and mitigating attacks at or near an entry point to the telecommunications network, mitigation of attacks on a telecommunications network may be achieved.

The present disclosure includes a signaling scrubber which may operate near an edge of a network core. Unlike other network security devices, the signaling scrubber monitors and processes signaling level network traffic between a device (e.g., an IoT device) and a telecommunications network in order to detect and mitigate network attacks. Although a system, method, or computer-readable storage medium are described herein in an exemplary configuration in which the signaling scrubber operates, the system, method, or computer-readable storage medium may be deployed at other locations within a telecommunications network and may be implemented in a non-5G environment.

FIG. 1 illustrates an example telecommunication system 100 that may be utilized to facilitate mobility management. As shown in FIG. 1, user equipment (UE) 110 may request a service, execute an application, perform an operation, provide status information, or the like, via radio access technology 120 and a telecommunications network 101 (e.g., a 4G network or 5G network). As depicted in FIG. 1, UE 110 may comprise any appropriate type of user equipment, such as, for example, a tablet 111, a smart phone 113, a camera 115, a meter 117, other IoT devices, or any appropriate combination thereof. Camera 115 and meter 117 may be examples of machine-to-machine (M2M) devices that are stationary. It is to be understood that the user equipment 110 as depicted in FIG. 1 is exemplary and not intended to be limiting.

UE 110 may gain access to the telecommunications network 101 via any appropriate mechanism. For example, as depicted in FIG. 1, access to the telecommunications network 101 may be provided via cellular infrastructure, Wi-Fi infrastructure, hot spots, or the like, or any appropriate combination thereof. FIG. 1 depicts, as examples, a macro cell 121 (e.g., LTE, 5G, etc.), a Wi-Fi access point 123, and a micro or metro cell 125. The macro cell 121 may include, for example, a next generation NodeB (gNodeB), which may be used to provide a connection between UE 110 and the telecommunications network 101.

Figure 2:
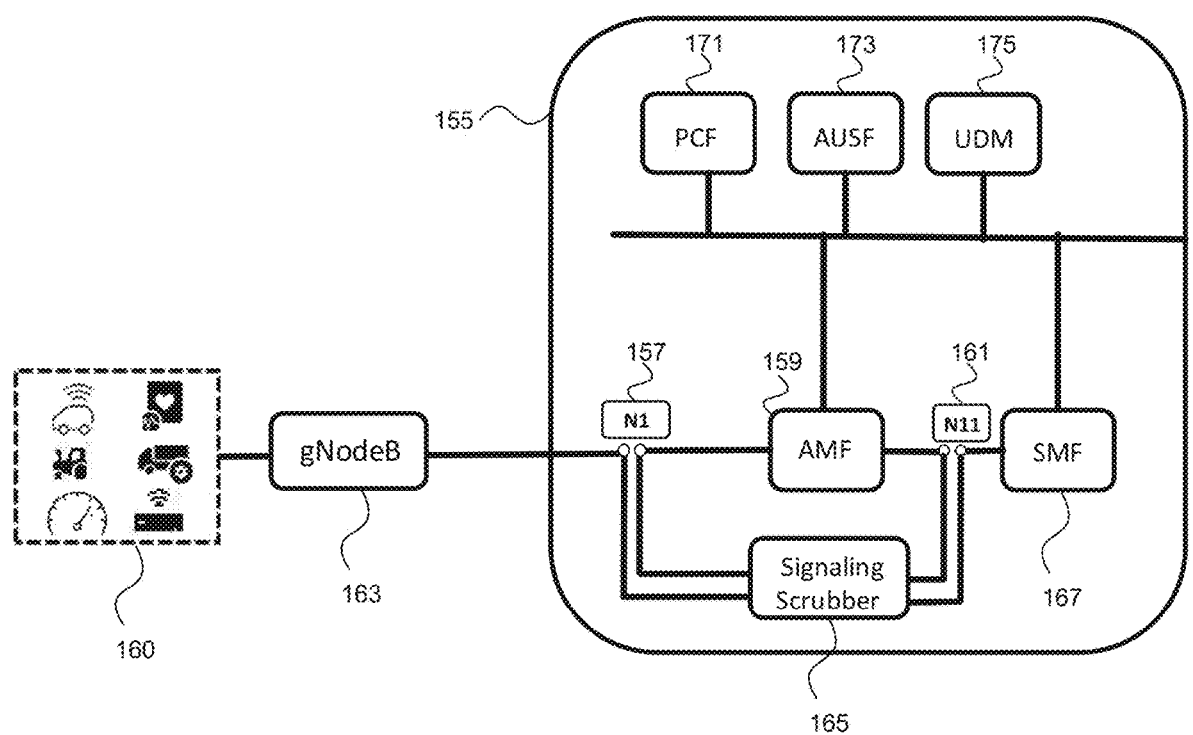
FIG. 2 is a schematic of an exemplary network device in accordance with the present disclosure.

FIG. 2 illustrates an exemplary system architecture 150 including according to one or more embodiments. The system architecture 150 may include core network 155, next generation NodeB (gNodeB) 163, and user equipment (UE) 160. The gNodeB 163 may be associated with macro cell 121. The UE 160 may be one or more IoT devices (e.g., smart meters, commercial security systems, traffic monitoring systems, weather monitoring systems, vehicles, smart home devices and sensors, and so on).

The core network 155 may include a Policy Control Function (PCF) component 171, an AUthentication Server Function (AUSF) component 173, a Unified Data Management (UDM) component 175. The PCF component 171 may be utilized to support a unified policy framework that governs network behavior by providing policy rules to a control plane function. The AUSF component 173 may be used to provide security processes (e.g., performing authentication of the UE 160). The UDM component 175 may host functions related to data management, such as an Authentication Credential Repository and Processing Function (ARPF), which selects an authentication method based on subscriber identity and configured policy and computes the authentication data and keying materials for the AUSF component 173, if needed.

The core network 155 may also include an N1 interface 157, an Access and Mobility Management Function (AMF) 159, an N11 interface 161, a Session Management Function (SMF) 167 and a signaling scrubber 165. The AMF 159 may provide functionality relating to session management (e.g., Registration Management, Connection Management, Reachability Management, Mobility Management, and various function relating to security and access management and authorization). The AMF 159 may also maintain a control plane signaling connection with the UE 160 and manage a registration procedure of the UE 160. The AMF 159 may also be responsible for paging.

The N1 interface 157 may serve as a reference point between the UE 160 and the AMF 159 in order to support UE and non-UE related services (e.g., configuration updates, UE context transfer, PDU Session resource management and support for mobility procedures) on a signaling level of telecommunications. The N1 interface 157 may also be used to establish a session for the UE 160 in order to exchange information between the UE 160 and the core network 155. The UE 160 may send signaling requests (e.g., attach to telecommunications network 101, re-register to the telecommunications communication network 101, authentication information, resource allocation information, etc.) to gNodeB 163, which may be forwarded to the N1 interface 157. The N1 interface 157 may also be used to observe registration and mobility events (e.g., device movement events).

The N11 interface 161 may serve as a reference point between the AMF 159 to the SMF 167. The N11 interface 161 may be used to forward session management requirements from the AMF 159 to the SMF 167. The SMF 167 may provide functionality relating to subscriber sessions (e.g. session establishment, modification, and release). The SMF 167 may also be used to interact with a decoupled data plane, create, update, or remove Protocol Data Unit (PDU) sessions, or manage session context with a User Plane Function (UPF).

The signaling scrubber 165 may reside in the core network 155 (e.g., at an edge router of the core network 155) and may be used to monitor signaling messages (e.g., connection establishment, authentication, or data channel requests) received from the UE 160 via the N1 interface 157 and the N11 interface 161 and identify harmful signaling events within the signaling messages making requests to the core network 155 (e.g., connection establishment, connection handover, data channel requests or disconnection, etc.) within a predetermined period (e.g., one minute, 5 minutes, etc.). For example, a significant amount of UEs 160 may send connection establishment, connection handover, or data channel requests simultaneously. An exemplary significant amount in this example may be more than 30% of all UEs 160 or more than 30% of a subset of UEs 160 of a particular UE type (e.g., sensor, thermostat, robot, wireless camera, mobile phone, server, client, storage device, etc.). The signaling scrubber 165 may also scrub identified harmful signaling events from the signaling messages before sending the signaling messages to other components within the core network 155 (e.g., signaling messages arriving at the N1 interface will continue to the AMF 159 after traversing the signaling scrubber 165 and signaling messages arriving at the N11 interface will continue to the SMF 167 after traversing the signaling scrubber 165). The signaling messages may be sent to establish a connection between the UE 160 and the core network 155.

Figure 3:
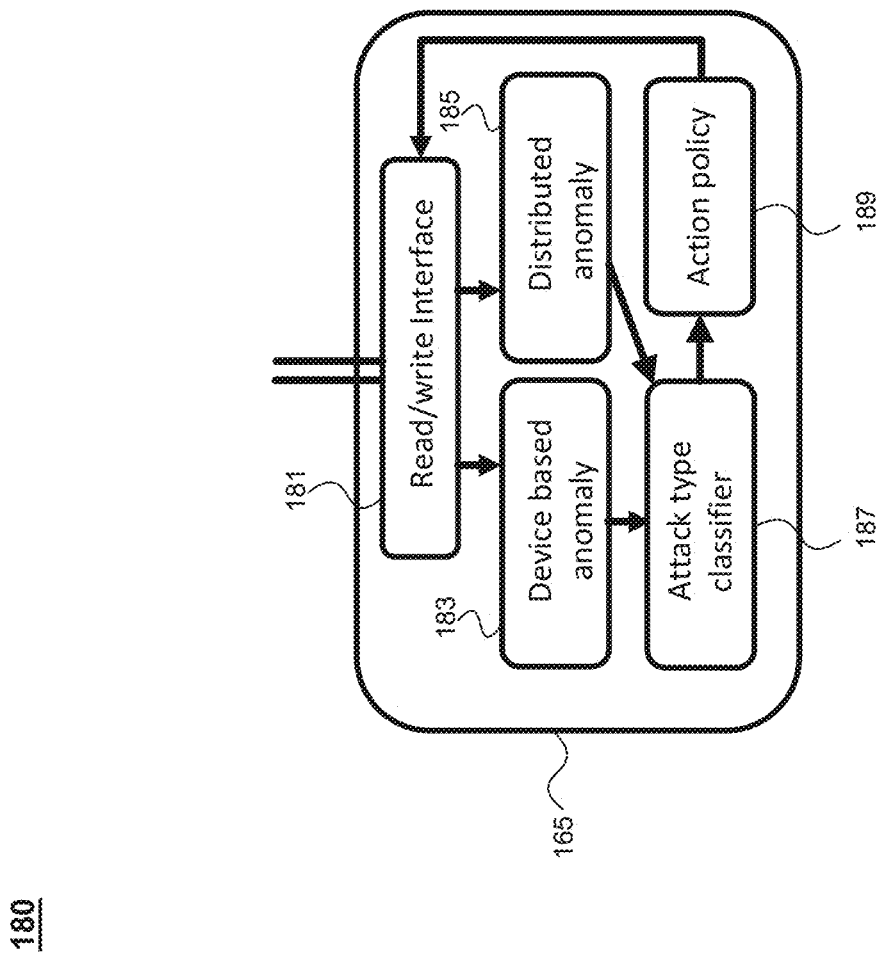
FIG. 3 is a schematic of an exemplary system architecture in accordance with the present disclosure.

FIG. 3 illustrates an exemplary system architecture 180 of the signaling scrubber 165 according to one or more embodiments. The signaling scrubber 165 may include a read/write interface 181, a device-based anomaly component 183, a distributed anomaly component 185, an attack type classifier component 187 and an action policy component 189.

A read/write interface 181 of the signaling scrubber 165 may receive signaling messages from the UE 160 via the N1 interface 157 and the N11 interface 161. The read/write interface 181 may also analyze the signaling messages to determine a message type (e.g., N1 or N11 message) and a signaling message destination (e.g., a specific AMF or gNodeB). The read/write interface 181 may also translate the received signaling messages into signaling events. The read/write interface 181 may also determine which signaling messages are suspicious and subsequently translate the suspicious signaling messages into signaling events.

The device-based anomaly component 183 may receive the signaling events from the read/write interface 181. The device-based anomaly component 183 may analyze the received signaling events in order to track device-based anomalies. A device-based anomaly may occur when a single device acts aggressively and generate large volume of signaling messages, which may affect local resources, such as the RAN or edge cloud elements. A device-based anomaly may also involve a UE 160 that does not follow back-off timer rules or a UE 160 exhibiting anomalous movement patterns. The device-based anomaly component 183 analysis may be based on one or more anomaly detection algorithms, which may encompass: maintaining a reputation for each chipset manufacturer (e.g., a Type Allocation Code (TAC) in an International Mobile Equipment Identity (IMEI)), identifying an IMEI that does not match a device fingerprint for a UE 160 or uses different parameters (e.g., using a different APN than usual or going into airplane mode) than typically used, identifying a reputation for IoT equipment types, identifying recurring IMEIs (e.g., encountering the same IMEI at different places at the same time), a SIM swapping IMEI-IMSI (e.g., IMEI identifies device hardware and IMSI identifies a subscriber's SIM card, and if a same IMSI is attached to different IMEIs (or vice versa) the result may be indicative of several SIM cards being used for the same device), identifying anomalous events (e.g., anomalous attaches per day, attaches per device (high/low/average), per equipment type (high/low/average), etc.), or roamers IoT/consumer (e.g., a device that is subscribed to a different network and gets service from a local network, which would be suspicious if the device is a stationary IoT device or an IoT device that does not normally travel out of network). If the received device-based anomalies exceed a dynamic threshold, the device-based anomalies may be indicative of an impending or occurring DoS attack (e.g., a cyber-attack in which hackers attempt to make a machine or network resource unavailable to its intended users by temporarily or indefinitely disrupting services of a host connected to the Internet) or DDoS attack (e.g., a DoS attack using multiple machines working together to attack a target) on the core network 155. For example, a device may request a connection to the network, which may occur after a restart and therefore a rare event. The connection request may be used to obtain resources from the network, such as applying policy, authentication, resource allocation, etc. Accordingly, if a set of devices start make connection requests to the network many times per second (e.g., 10 or more times per second—dynamic threshold), which could overload the network and be indicative of an impending or occurring DoS or DDoS attack on the network.

The distributed anomaly component 185 may also receive the signaling events from the read/write interface 181. The distributed anomaly component 185 may analyze the received signaling events in order to track distributed anomalies. A distributed anomaly may occur when a set of devices act in combination to generate large volume of signaling messages that may affect the network core. For example, the set of UE 160 may all establish connections with the core network 155 or restart simultaneously. The distributed anomaly component 185 analysis may be based on one or more anomaly detection algorithms, which may encompass: maintaining a reputation for each chipset manufacturer (e.g., a Type Allocation Code (TAC) in an International Mobile Equipment Identity (IMEI)), identifying an IMEI that does not match a device fingerprint for a UE 160 or uses different parameters than usual, identifying a reputation for IoT equipment types, identifying recurring IMEIs (e.g., encountering the same IMEI at different places at the same time), a SIM swapping IMEI-IMSI, identifying anomalous events (e.g., anomalous attaches per day, attaches per device (high/low/average), attaches per day, per equipment type (high/low/average), etc.), or roamers IoT/consumer. If the received distributed anomalies exceed a dynamic threshold, the distributed anomalies may be indicative of an impending or occurring DoS or DDoS attack on the core network 155.

The attack type classifier component 187 may receive the device-based anomalies from the device-based anomaly component 183 and the distributed anomaly component 185. The attack type classifier component 187 may classify each of the received device-based anomalies or distributed anomalies based on known attack types, which may be stored in the signaling scrubber 165. For example, the attack type classifier component 187 may determine, based on the received device-based anomalies, that an attack is a local attack involving a single site or facility. In another example, the attack type classifier component 187 may determine that an attack is caused by a specific service or use a specific platform, such as drone devices. Remediating an attack using drone devices may be difficult because the drone devices may be moving between tracking areas, as well as generating many signaling events. If the received device-based anomalies are not based on known attack types, the device-based anomalies may be sent to one or more analysts, who may assign attack types to each device-based anomaly, which may be stored in a repository of the signaling scrubber 165. Attack types may include volume-based attacks, protocol attacks, or application layer attacks.

The action policy component 189 may receive a classified attack type from the attack type classifier component 187 and determine an action to remediate a DoS or DDoS attack. The action policy component 189 may assign an action policy for scrubbing the received signaling messages based on the determined action from an action policy set. The action policy set may include an action that restricts a rate of attaches from the UE 160 or rate of attaches of UE 160 that belong to a certain service (e.g., the service may be related to connected cars, security camera or smart meters). Accordingly, an attack may be constrained to a certain service in which a vulnerability has been found and exploited. The action policy set may include an action denying all registration requests of a set of UE 160 or selectively denying a portion of the set of UE 160 to reduce a rate of control messages. The action policy set may also include an action excluding a set of privileged UE 160 (e.g., critical services, VIP subscribers, etc.) or applying a priority to a set of UE 160 based on parameters (e.g., by hardware manufacturer of the chipset, device serial number, device model number, etc.). The action policy set may also include an action tearing down UE 160 (e.g., disconnecting the UE 160) utilized in a DoS or DDoS attack that are already connected to the core network 155. The action policy set may also support a 'no-action' or a 'report-only' for instances where a DoS or DDoS attack is mild or involves sensitive devices that require manual action.

For example, a mild attack may be an increase in signaling traffic (e.g., a 10% increase), which may be an abnormal increase but does not overload the network. Although the abnormal signaling traffic increase did not overload the network, the event may be reported because this event may be indicative of a future a DoS or DDoS attack. For example, attacks involving sensitive devices or services (e.g., devices that belong to first responders or E911 calls) may still need to be connected to the network. Accordingly, a manual decision may be utilized to apply a policy action to the sensitive devices or services.

Figure 4:
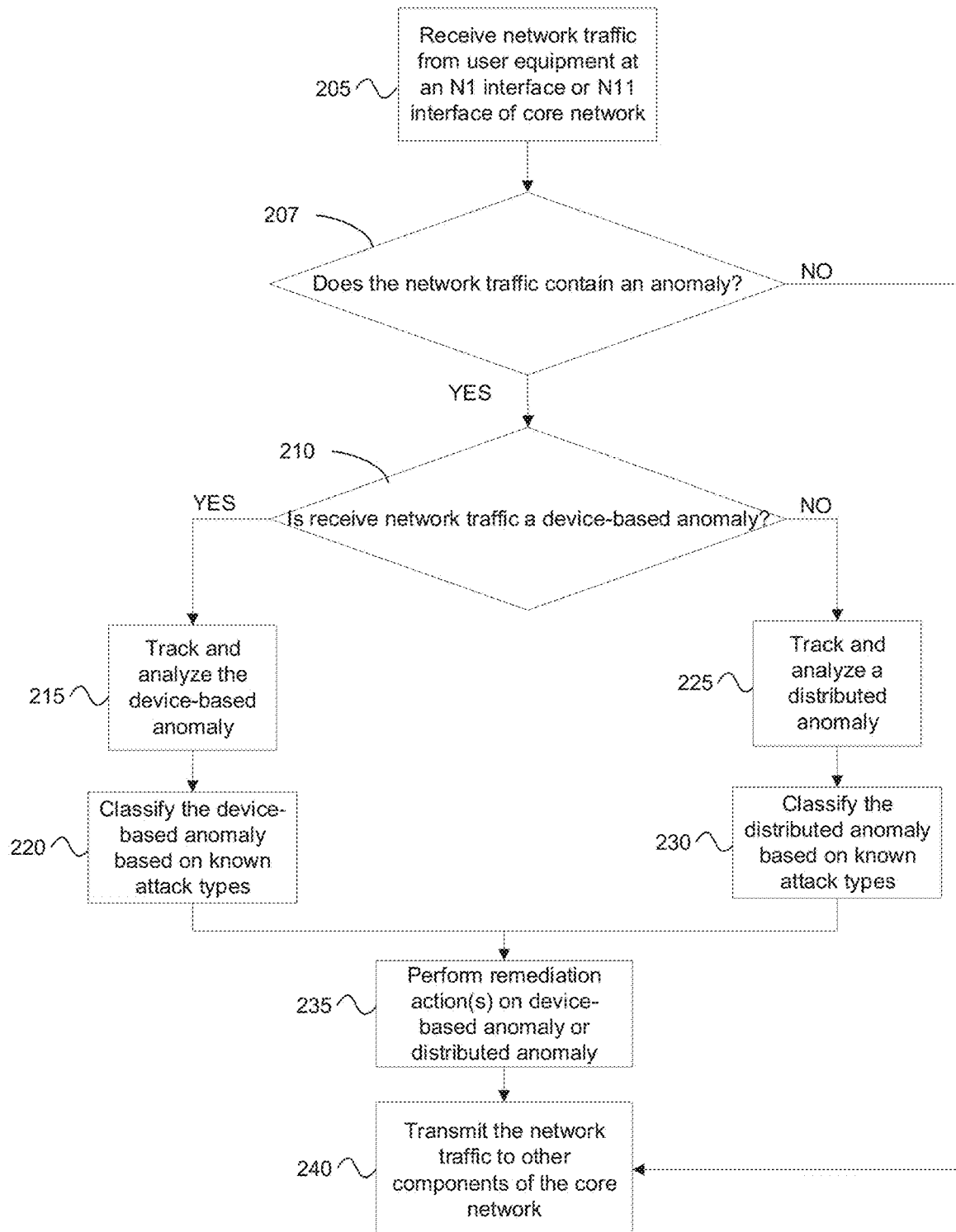
FIG. 4 is a flowchart of an exemplary method of operation for the architecture described in FIG. 3.

An exemplary operational flowchart in accordance with a method of the present disclosure is illustrated in FIG. 4, which may be utilized for scrubbing signaling messages. At block 205, the signaling scrubber 165 may receive network traffic (e.g., signaling messages from UE 160, such as RRC messages) at the N1 interface 157 or the N11 interface 161. The UE 160 generating the network traffic may be one or more IoT devices. At block 207, the signaling scrubber 165, may determine whether the network traffic includes one or more anomalies. If the signaling scrubber 165 determines that the network traffic does not include an anomaly, the method proceeds to block 240, which is described below.

If the signaling scrubber 165 determines that the network traffic includes an anomaly, the method proceeds to block 210 where the signaling scrubber 165 may determine whether the network traffic is associated with a device-based anomaly. If the signaling scrubber 165 determines that the network traffic is associated with a device-based anomaly, the method proceeds to block 215 where the signaling scrubber 165 may track and analyze the device-based anomaly. The analysis of the device-based anomaly may be used to determine whether the device-based anomaly is associated a DoS or DDoS attack. At block 220, the signaling scrubber 165 may classify the device-based anomaly based on known attack types. The method then proceeds to block 235.

If the signaling scrubber 165 determines that the network traffic is not associated with a device-based anomaly (e.g., a distributed anomaly), the method proceeds to block 225 where the signaling scrubber 165 may track and analyze a distributed anomaly. The analysis of the distributed anomaly may determine whether the distributed anomaly is associated a DoS or DDoS attack. At block 230, the signaling scrubber 165 may classify the distributed anomaly based on known attack types.

At block 235, the signaling scrubber 165 may perform remediation on the device-based anomaly or the distributed anomaly based on known attack types associated with the signaling scrubber 165. The remediation may implement an action policy for scrubbing signaling messages associated with the device-based anomaly or the distributed anomaly to mitigate a DoS or DDoS attack. At block 240, the signaling scrubber 165 may transmit the remediated signaling messages, as well as non-anomalous signaling messages to other components of the core network 155 in order to exchange information for the establishment of communications and control the UE 160.

Accordingly, the present disclosure provides a system that may mitigate DoS or DDoS attacks using signaling messages from user equipment (UE) (e.g., an IoT device or mobile device) to connect to the mobile networks. The system may utilize signal scrubber to analyze signaling messages (i.e. e.g., radio resource control (RRC)) sent by the UE when attempting to connect to a telecommunications network to determine whether the signaling messages include one or more anomalies, which may be indicative of a DoS or DDoS attack. The signal scrubber may identify non-anomalies, device-based anomalies or distribute anomalies. Based on an identified anomaly, the signal scrubber may implement an action policy to mitigate a DoS or DDoS attack.

The signal scrubber may be placed in-line with N1 and N11 interfaces of a network core in order to monitor these interfaces and scrub harmful events received at these interfaces. The N1 interface may be monitored by the signal scrubber because the N1 interface indirectly connects the UE to the AMF, which allows the N1 interface to observe registration and mobility events (such as device movement events); however, these events often lack some user information, which may be obtained at the N11 interface. The event information at the N1 interface and the N11 interface may be used to detect anomalous signaling message which may be indicative of a DoS or DDoS attack.

Scrubbing messages traversing the N1 interface, by the signal scrubber, may be used to protect the AMF and scrubbing messages traversing the N11 interface may be used to protect the SMF. The signal scrubber may implement a plurality of components to scrub harmful events. Component 1 of the signaling scrubber may be a read/write interface, which may be used to receive signaling messages from the N1 interface and the N11 interface and translates the signaling messages to events. Component 2 of the signaling scrubber may be an interface that may be used to track device-based anomalies, for example, a device that does not follow back-off timer rules or a device which has anomalous movement patters. Component 3 of the signaling scrubber may be an interface that may be used to track distributed anomalies that involve a set of devices. Component 4 of the signaling scrubber may be an interface that may be used to classify an attack type based on familiar known patterns. Component 5 of the signaling scrubber may be an interface that may utilize the classification of an attack type to select a mitigation action and assign an action policy to scrub the harmful events. The action policy may be a policy selected from a policy set which may include: denying all registration requests of a set of devices, selectively denying a portion of the set of devices while allowing non-selected devices to connect, reducing rate of control messages, excluding a set of privileged devices (e.g., devices providing critical services, devices associated with VIP subscribers, etc.), applying a priority to the devices based on parameters (e.g., hardware manufacturer of the chipset), actions similar to tear-down of anomalous devices that are already connected to the network, 'no-action' or 'report-only' for instances where a DoS or DDoS attack is mild or involves sensitive devices that require manual action.

Accordingly, the signal scrubber may read signaling messages and detect device-based anomalies and distributed anomalies. If the signaling messages do not include device-based anomalies and distributed anomalies the signaling messages may be written back to the AMF. When device-based anomalies and distributed anomalies are detected, events associated with the device-based anomalies and distributed anomalies may be classified based on known attack types. Based on the attack type the signal scrubber may apply an action policy to the events, which may implement one or more actions (e.g., blocking some or all signaling events associated with an identified attack type) to mitigate a DoS or DDoS attack.

The signaling scrubber may implement a variety of algorithms for anomaly detection. For example, anomaly detection algorithms may be based on: chipset manufacturers reputation (TAC in IMEI), IMEI—device fingerprint matching (e.g., using different parameters than usually), identifying a reputation of IoT equipment types, identifying recurring IMEIs (e.g., finding the same IMEI being used at the same time in different places), SIM swapping IMEI-IMSI, identifying anomalous events (e.g., attaches per day for a given device and assigning a rating (high/low/average)), identifying anomalous events (e.g., attaches per day, per equipment type and assigning a rating (high/low/average), and roamers IoT/consumer.

The system described herein may be used to address a variety of attacks on a telecommunications network. For example, the system may address an IoT device botnet problem where an attacker takes over a certain set of IoT devices and creates a botnet. The attacker may then instruct all botnet devices coordinately overload either a control plane (e.g., attach storm) or a user plane (e.g., simultaneous large downloads) of the communications network leading to a DoS. To address the IoT device botnet problem, the system may perform detection based on anomalous attach patterns of the IoT devices associated with the botnet. The system may attribute the botnet attack to a particular service and apply a policy that restricts the rate of attaches of the devices belonging to the particular service.

For example, the system may address a localized DDoS operation problem where an attacker assembles a set of IoT devices, which optimized to overload the network's control plane. The attacker uses a pre-paid SIM card to authenticate and activate the IoT devices on the network. The attacker may then install an application on the devices that may be used to generate large amount of control plane events in order to overwhelm a radio and core network's control plane. The system may identify anomalous patterns and classify a set of devices based on location and chipset manufacturer, which may be a part of IMEI. The system may perform an action to block attach requests from the devices that are classified as part of the localized DDoS operation. The system may also cause a RAN edge element (e.g., RIC) to mark these devices and prevent a scheduler from allocating radio resources for these devices.

For example, the system may address an airborne drone DDoS attack problem where attackers use drones to move between tracking areas or registration areas with several devices attached to each drone. The attackers may then use the drones and attached devices to cause an abnormal amount of handovers and system reattaches to overwhelm network resources. The system may detect anomalous location patterns for the devices to identify a set of rogue devices. The system may then block all devices of the identified set.

While the system is described in relation to a 5G network, the system may also be employed in a non-5G network. For example, in an LTE network, the signal scrubber may be placed in-line with S1 and S11 interfaces of a network core in order to monitor these interfaces and scrub harmful events received at these interfaces, which may be related to a Mobility Management Entity (MME) and Serving Gateway (SGW).

Disclosed herein is a device having a processor and a memory coupled with the processor. The processor effectuates operations including receiving, by a first portion of a telecommunications network, network traffic from one or more user equipment (UE). The processor further effectuates operations including routing the network traffic to a signaling scrubber, wherein the signaling scrubber performs operations, which include receiving signaling messages traversing an N1 interface or an N11 interface from the network traffic, translating the signaling messages into one or more events, detecting one or more anomalies by analyzing the one or more events, determining whether the one or more anomalies is indicative of a denial of service (DoS) attack on the telecommunications network and performing a remediation action to the signaling messages resolving the DoS attack when the one or more anomalies is indicative of a DoS attack. The processor further effectuates operations including routing the network traffic to a second portion of the telecommunications network to establish a communication session for the one or more UE.

Figure 5:
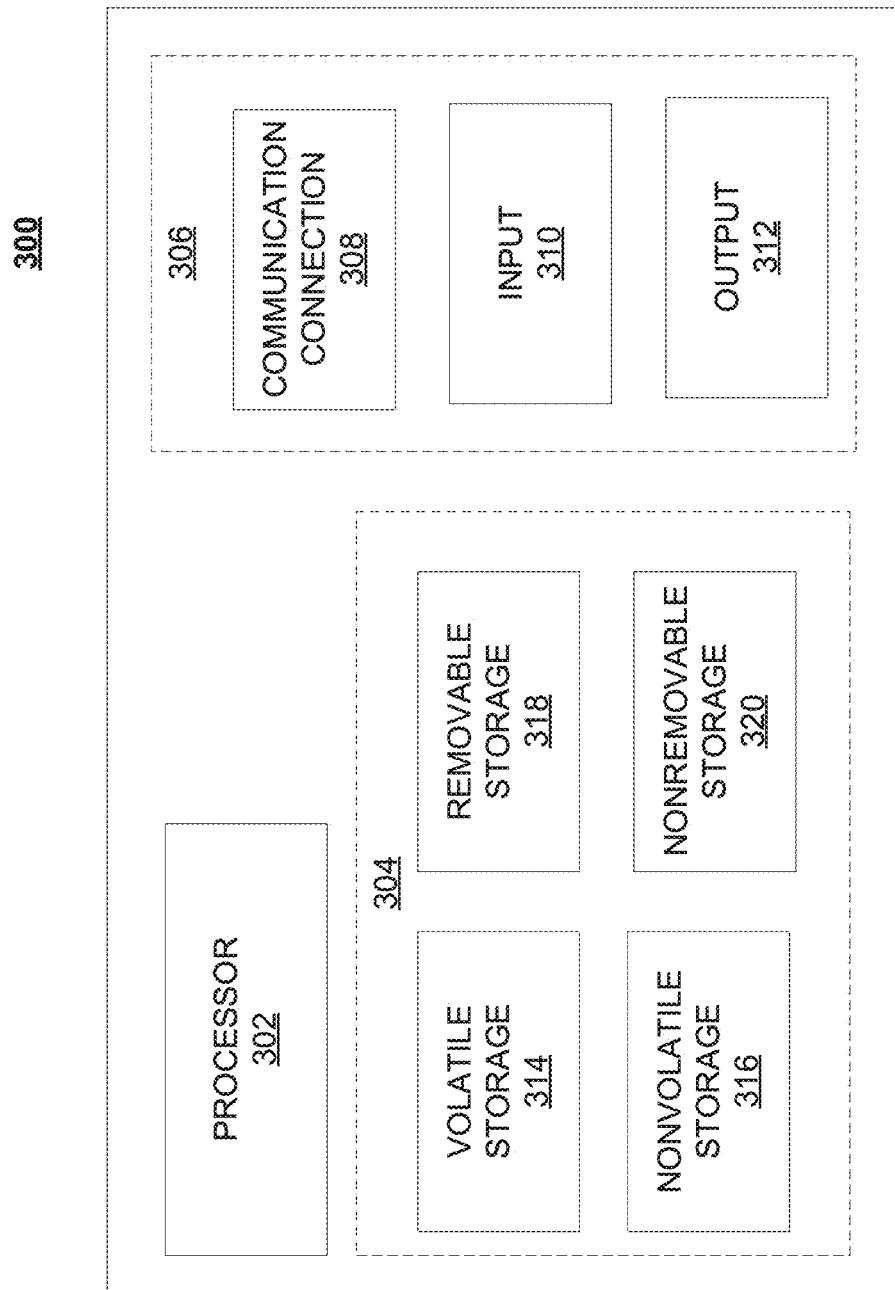
FIG. 5 is a schematic of an exemplary network device.

FIG. 5 is a block diagram of network device 300 that may be associated with equipment of FIG. 1 or FIG. 2. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller, or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 5) to allow communications therebetween. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
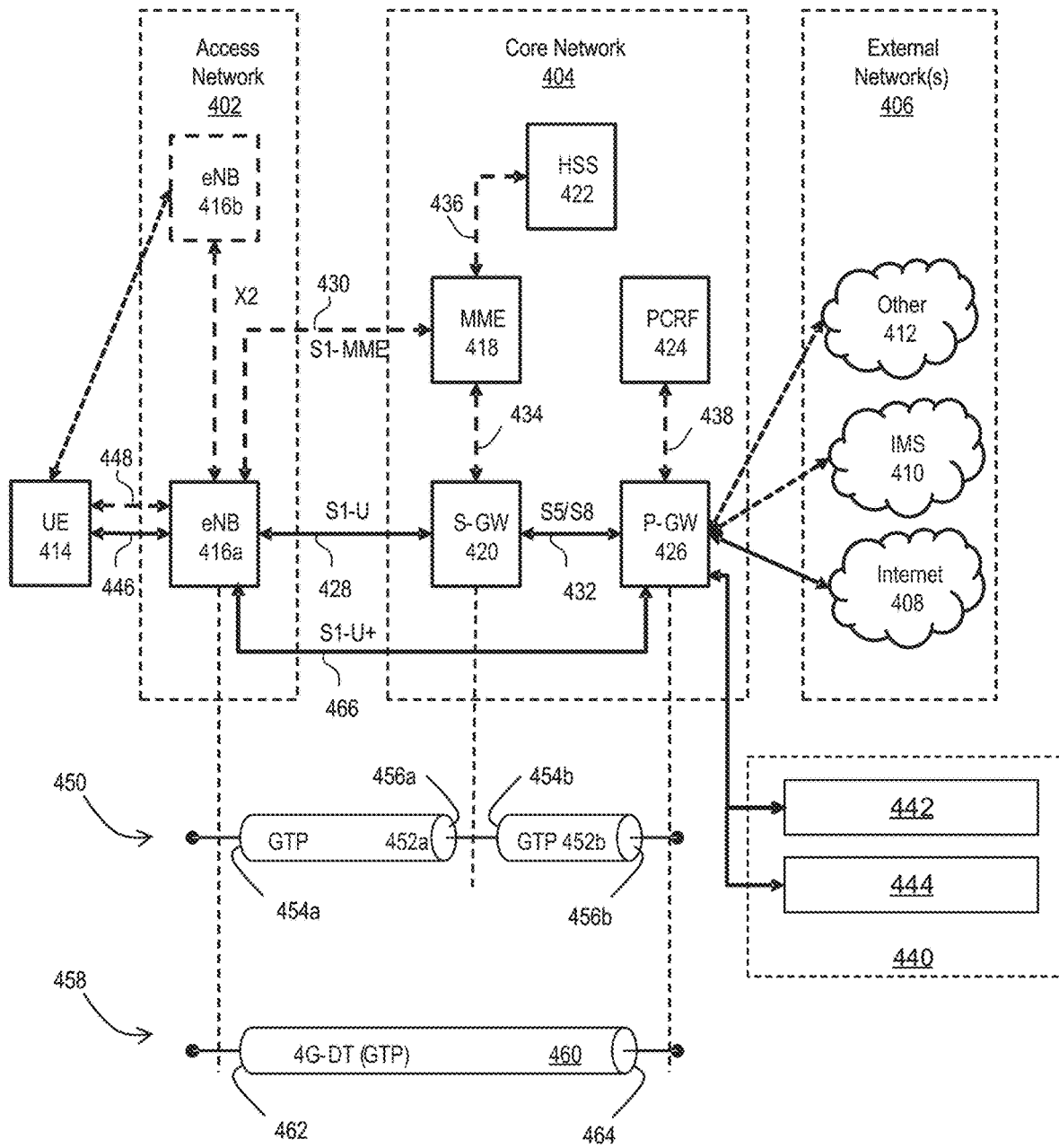
FIG. 6 depicts an exemplary communication system that provide wireless telecommunication services over wireless communication networks with which edge computing node may communicate.

FIG. 6 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (eNodeB), with which UE 414 communicates over the air and wirelessly. UEs 414 can include, without limitation, wireless devices, e.g., satellite communication systems, portable digital assistants (PDAs), laptop computers, tablet devices, Internet-of-things (IoT) devices, and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media, and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths or interfaces are terms that can include features, methodologies, or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory or disk drive. It is understood that storage device 440 can include registers suitable for storing address values. Alternatively, or in addition, storage device 440 can be separate from PGW 426, for example, as an external hard drive, a flash drive, or network storage.

Storage device 440 selectively stores one or more values relevant to the forwarding of packet data. For example, storage device 440 can store identities or addresses of network entities, such as any of network nodes 418, 420, 422, 424, and 426, eNBs 416 or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, or other data structures generally well understood and suitable for maintaining or otherwise manipulate forwarding addresses on a per bearer basis.

It should be noted that access network 402 and core network 404 are illustrated in a simplified block diagram in FIG. 6. In other words, either or both of access network 402 and the core network 404 can include additional network elements that are not shown, such as various routers, switches, and controllers. In addition, although FIG. 6 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 6. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address, and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 7:
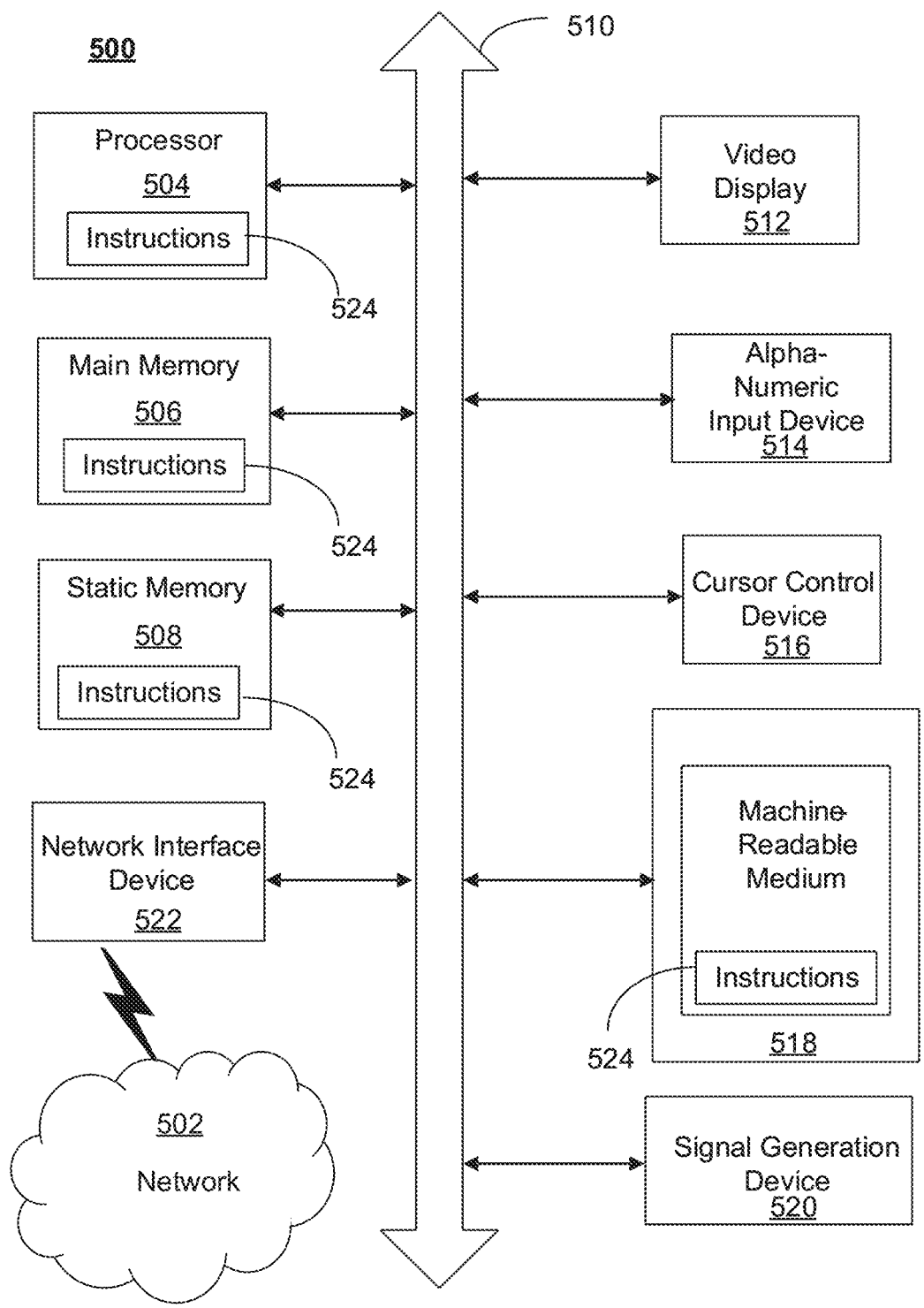
FIG. 7 depicts an exemplary communication system that provide wireless telecommunication services over wireless communication networks with which edge computing node may communicate.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1-4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 518 on which is stored one or more sets of instructions (e.g., software 524) embodying any one or more of the methods or functions described herein, including those methods illustrated above. Instructions 524 may also reside, completely or at least partially, within main memory 506, static memory 508, or within processor 504 during execution thereof by the computer system 500. Main memory 506 and processor 504 also may constitute tangible computer-readable storage media.

Figure 8:
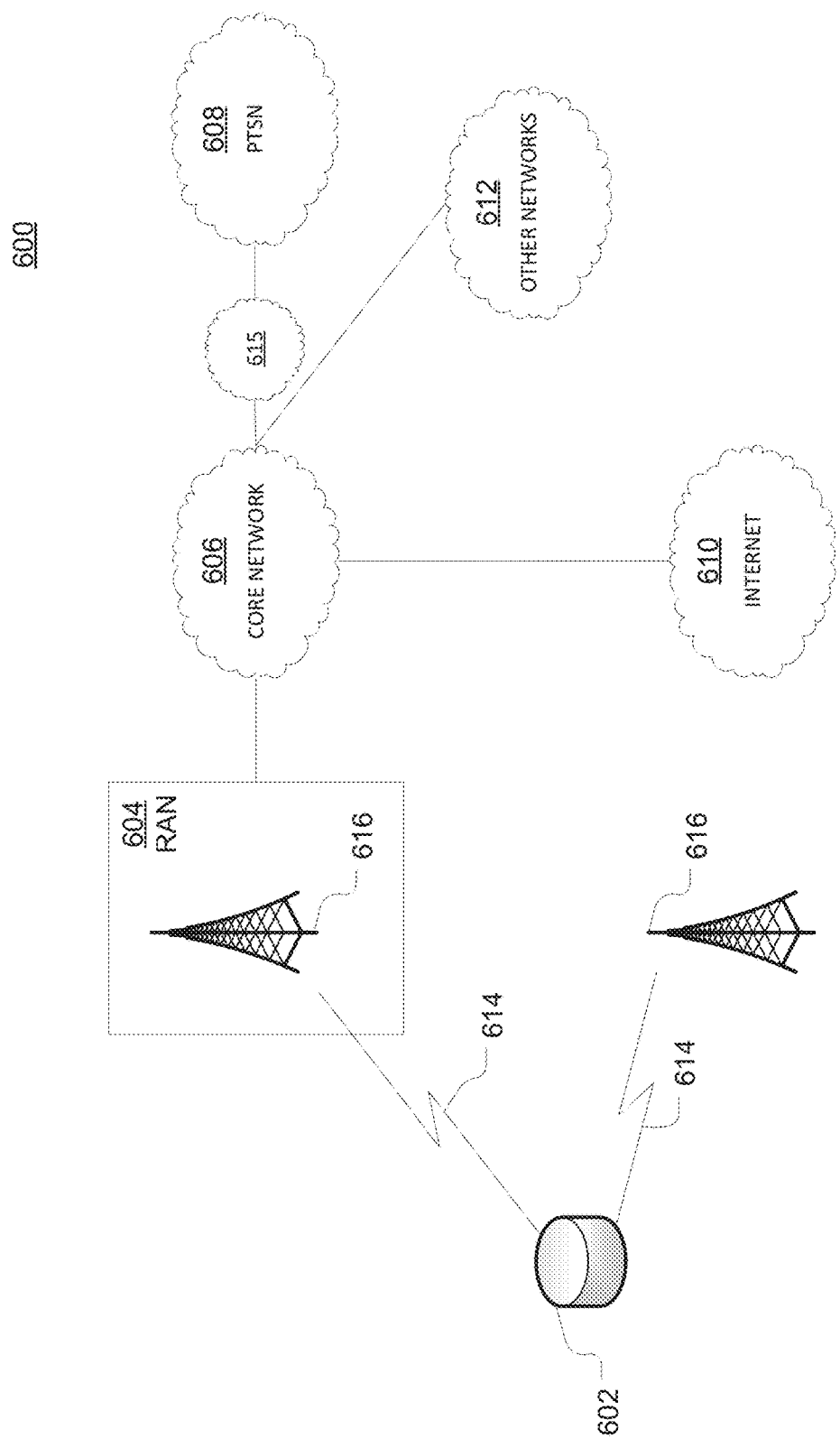
FIG. 8 is a diagram of an exemplary telecommunications system in which the disclosed methods and processes may be implemented with which edge computing node may communicate.

As shown in FIG. 8, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise IoT devices 32, mobile devices 33, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNodeB, a Home Node B, a Home eNodeB, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 8, base station 616 may have a direct connection to Internet 610. Thus, base station 616 may not be required to access Internet 610 via core network 606.

RAN 604 may be in communication with core network 606, which may be any type of network configured to provide voice, data, applications, or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 8, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

While examples of described telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

The invention claimed is:

1. A device, comprising:
a processor; and
a memory coupled with the processor, the memory storing executable instructions that when executed by the processor, cause the processor to effectuate operations comprising:
receiving, from network traffic, first signaling messages traversing a first interface associated with an Access and Mobility Management Function (AMF) of a core network and second signaling messages traversing a second interface associated with a Session Management Function (SMF) of the core network, wherein the first signaling messages are intercepted by the processor prior to reaching the AMF, and wherein the second signaling messages are intercepted by the processor prior to reaching the SMF;
translating the first signaling messages and the second signaling messages into one or more events;
detecting one or more anomalies by analyzing the one or more events;
determining whether the one or more anomalies is indicative of an attack on a telecommunications network; and
performing a remediation action to the first signaling messages and the second signaling messages to resolve the attack when the one or more anomalies is indicative of the attack on the telecommunications network.

2. The device of claim 1, wherein the processor is positioned in-line with the first interface and the second interface so as to intercept the first signaling messages and the second signaling messages, wherein the first signaling messages include user equipment (UE) registration and mobility information, wherein the second signaling messages include user information, wherein the determining whether the one or more anomalies is indicative of the attack on the telecommunications network is based on an analysis of the UE registration and mobility information in the first signaling messages and the user information in the second signaling messages, and wherein the processor further effectuates operations comprising sending the first signaling messages to the AMF and the second signaling messages to the SMF after the performing the remediation action to resolve the attack.

3. The device of claim 1, wherein the processor further effectuates operations comprising classifying the one or more anomalies according to an attack type and implementing an action policy to perform the remediation action based on the attack type.

4. The device of claim 1, wherein the one or more anomalies comprise attaches per day, attaches per device, or attaches per day per equipment type exceeding a predetermined threshold.

5. The device of claim 1, wherein the first and second signaling messages are received at an edge router from one or more Internet-of-things (IoT) devices.

6. The device of claim 1, wherein the remediation action comprises denying all registration requests of a set of user equipment (UE) of a plurality of UE to connect to the telecommunications network, denying a set of UE of the plurality of UE from connecting to the telecommunications network while allowing another set of UE of the plurality of UE to connect to the telecommunications network, reducing a rate of control messages from the plurality of UE, or blocking attach requests from the plurality of UE associated with a determined attack type.

7. The device of claim 1, wherein the network traffic comprises a request to attach to the telecommunications network, a request to re-register to the telecommunications network, a request for authentication information, or a request for resource allocation information.

8. The device of claim 1, wherein the first interface is a N1 interface or a S1 interface and the second interface is a N11 interface or a S11 interface.

9. A computer-implemented method comprising:
receiving, by a processor, first signaling messages traversing a first interface associated with an Access and Mobility Management Function (AMF) of a core network and second signaling messages traversing a second interface associated with a Session Management Function (SMF) of the core network, wherein the first signaling messages are intercepted by the processor prior to reaching the AMF, and wherein the second signaling messages are intercepted by the processor prior to reaching the SMF;

translating, by the processor, the first signaling messages and the second signaling messages into one or more events;

detecting, by the processor, one or more anomalies by analyzing the one or more events;

determining, by the processor, whether the one or more anomalies is indicative of an attack on a telecommunications network; and performing, by the processor, a remediation action to the first signaling messages and the second signaling messages to resolve the attack when the one or more anomalies is indicative of the attack on the telecommunications network.

10. The computer-implemented method of claim 9, wherein the first and second signaling messages are included in network traffic, wherein the processor is positioned in-line with the first interface and the second interface so as to intercept the first signaling messages and the second signaling messages, wherein the first signaling messages include user equipment (UE) registration and mobility information, wherein the second signaling messages include user information, wherein the determining whether the one or more anomalies is indicative of the attack on the telecommunications network is based on an analysis of the UE registration and mobility information in the first signaling messages and the user information in the second signaling messages, and wherein the computer-implemented method further comprises sending the first signaling messages to the AMF and the second signaling messages to the SMF after the performing the remediation action to resolve the attack.

11. The computer-implemented method of claim 9 further comprising classifying the one or more anomalies according to an attack type and implementing an action policy to perform the remediation action based on the attack type.

12. The computer-implemented method of claim 9, wherein the one or more anomalies comprise attaches per day, attaches per device, or attaches per day per equipment type exceeding a predetermined threshold.

13. The computer-implemented method of claim 9, wherein the first and second signaling messages are received at an edge router from one or more Internet-of-things (IoT) devices.

14. The computer-implemented method of claim 9, wherein the remediation action comprises denying all registration requests of a set of user equipment (UE) of a plurality of UE to connect to the telecommunications network, denying a set of UE of the plurality of UE from connecting to the telecommunications network while allowing another set of UE of the plurality of UE to connect to the telecommunications network, reducing a rate of control messages from the plurality of UE, or blocking attach requests from the plurality of UE associated with a determined attack type.

15. The computer-implemented method of claim 10, wherein the network traffic comprises a request to attach to the telecommunications network, a request to re-register to the telecommunications network, a request for authentication information, or a request for resource allocation information.

16. The computer-implemented method of claim 9, wherein the first interface is a N1 interface or a S1 interface and the second interface is a N11 interface or a S11 interface.

17. A non-transitory computer-readable storage medium storing executable instructions that when executed by a processor causes said processor to effectuate operations comprising:

receiving, from network traffic originating from one or more user equipment (UEs), first signaling messages traversing a first interface associated with an Access and Mobility Management Function (AMF) of a core network and second signaling messages traversing a second interface associated with a Session Management Function (SMF) of the core network, wherein the first signaling messages are intercepted by the processor prior to reaching the AMF, and wherein the second signaling messages are intercepted by the processor prior to reaching the SMF;

translating the first signaling messages and the second signaling messages into one or more events;

detecting one or more anomalies by analyzing the one or more events;

determining whether the one or more anomalies is indicative of a denial-of-service (DoS) attack on a telecommunications network; and performing a remediation action to the first signaling messages and the second signaling messages to resolve the DoS attack when the one or more anomalies is indicative of the DoS attack on the telecommunications network.

18. The non-transitory computer-readable storage medium of claim 17, wherein the processor is positioned in-line with the first interface and the second interface so as to intercept the first signaling messages and the second signaling messages, wherein the first signaling messages include UE registration and mobility information, wherein the second signaling messages include user information, wherein the determining whether the one or more anomalies is indicative of the attack on the telecommunications network is based on an analysis of the UE registration and mobility information in the first signaling messages and the user information in the second signaling messages, and wherein the processor further effectuates operations comprising sending the first signaling messages to the AMF and the second signaling messages to the SMF after the performing the remediation action to resolve the DoS attack.

19. The non-transitory computer-readable storage medium of claim 17, wherein the one or more anomalies are attaches per day, attaches per device, or attaches per day per equipment type exceeding a predetermined threshold.

20. The non-transitory computer-readable storage medium of claim 17, wherein the remediation action comprises denying all registration requests of a set of UE of a plurality of UE to connect to the telecommunications network, denying a set of UE of the plurality of UE from connecting to the telecommunications network while allowing another set of UE of the plurality of UE to connect to the telecommunications network, reducing a rate of control messages from the plurality of UE, or blocking attach requests from the plurality of UE associated with a determined attack type.

* * * * *